(12) United States Patent
Huang et al.

(10) Patent No.: US 10,180,199 B2
(45) Date of Patent: Jan. 15, 2019

(54) FLUID CONTROL DEVICE HAVING A PIEZOELECTRIC ACTUATOR

(71) Applicant: Microjet Technology Co., Ltd., Hsinchu (TW)

(72) Inventors: Che-Wei Huang, Hsinchu (TW); Shih-Chang Chen, Hsinchu (TW); Jia-Yu Liao, Hsinchu (TW); Yung-Lung Han, Hsinchu (TW); Chi-Feng Huang, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 0 days.

(21) Appl. No.: 15/859,974

(22) Filed: Jan. 2, 2018

(65) Prior Publication Data

US 2018/0187797 A1 Jul. 5, 2018

(30) Foreign Application Priority Data

Jan. 5, 2017 (TW) .............................. 106100263 A (51) Int. Cl.
*F16K 99/00* (2006.01)
*F04B 39/12* (2006.01)
(Continued)

(52) U.S. Cl.
CPC .......... *F16K 99/0048* (2013.01); *F04B 39/12* (2013.01); *F04B 43/046* (2013.01);
(Continued)

(58) Field of Classification Search
CPC ............... F16K 99/0048; F16K 25/005; F16K 99/0015; F16K 31/004; F16K 2099/0094;
(Continued)

(56) References Cited

U.S. PATENT DOCUMENTS 5,065,978 A * 11/1991 Albarda ............... B41J 2/17596
251/368
6,142,444 A * 11/2000 Kluge ....................... F15C 3/04
137/831
(Continued)

FOREIGN PATENT DOCUMENTS

EP 2568176 A1 3/2013
TW M528306 U 9/2016

OTHER PUBLICATIONS

Extended European Search Report, dated Apr. 6, 2018, for European Application No. 18150089.3.

*Primary Examiner* — John Bastianelli
(74) *Attorney, Agent, or Firm* — Birch, Stewart, Kolasch & Birch, LLP (57) ABSTRACT

A fluid control device includes a piezoelectric actuator, a housing and a glue body. The piezoelectric actuator includes a suspension plate, an outer frame, a bracket and a piezoelectric element. The housing includes an outlet plate and a base. The outlet plate accommodates the piezoelectric actuator and the base includes an inlet plate and a resonance plate. The glue body is arranged between the outer frame and the resonance plate to maintain a gap formed therebetween. The suspension plate is made of a material having a linear expansion coefficient less than a linear expansion coefficient of the piezoelectric element. The suspension plate has a specified hardness to maintain a curved shape after being heated, and the linear expansion coefficient of the suspension plate is different from a linear expansion coefficient of the resonance plate, so that an effective deformation displacement between the suspension plate and the resonance plate is obtained.

15 Claims, 5 Drawing Sheets

(51) Int. Cl.
  *F04B 43/04*  (2006.01)
  *F04B 45/047*  (2006.01)
  *F04D 33/00*  (2006.01)
  *F16K 25/00*  (2006.01)
  *F16K 31/00*  (2006.01)

(52) U.S. Cl.
  CPC ............ *F04B 45/047* (2013.01); *F04D 33/00* (2013.01); *F16K 25/005* (2013.01); *F16K 31/004* (2013.01); *F16K 99/0015* (2013.01); *F16K 2099/0094* (2013.01)

(58) Field of Classification Search
  CPC ...... F04B 39/12; F04B 45/047; F04B 43/046; F04D 33/00
  USPC ............................................ 251/129.06, 368
  See application file for complete search history.

(56) References Cited

U.S. PATENT DOCUMENTS

| | | | |
|---|---|---|---|
| 7,025,324 B1* | 4/2006 | Slocum | B01L 3/502738 251/11 |
| 7,258,533 B2* | 8/2007 | Tanner | F04B 43/046 137/855 |
| 2001/0029983 A1* | 10/2001 | Unger | B01L 3/502707 137/597 |
| 2004/0079424 A1* | 4/2004 | Takeda | F15C 5/00 137/624.13 |
| 2013/0058810 A1* | 3/2013 | Hirata | F04B 43/043 417/413.2 |
| 2015/0114222 A1 | 4/2015 | Murakami | |

* cited by examiner

FLUID CONTROL DEVICE HAVING A PIEZOELECTRIC ACTUATOR

FIELD OF THE INVENTION

The present invention relates to a fluid control device, and more particularly to a slim and silent fluid control device.

BACKGROUND OF THE INVENTION

With the advancement of science and technology, fluid transportation devices used in many sectors such as pharmaceutical industries, computer techniques, printing industries or energy industries are developed toward elaboration and miniaturization. The fluid transportation devices are important components that are used in for example micro pumps, micro atomizers, printheads or industrial printers. Therefore, it is important to provide an improved structure of the fluid transportation device.

For example, in the pharmaceutical industries, pneumatic devices or pneumatic machines use motors or pressure valves to transfer gases. However, due to the volume limitations of the motors and the pressure valves, the pneumatic devices or the pneumatic machines are bulky in volume. In other words, the conventional pneumatic device fails to meet the miniaturization requirement, and is not suitable to be installed in or cooperated with portable equipment. Moreover, during operations of the motor or the pressure valve, annoying noise is readily generated.

Therefore, it is important to provide a fluid control device with small, miniature, silent, portable and comfortable benefits in order to eliminate the above drawbacks.

Figure 1:
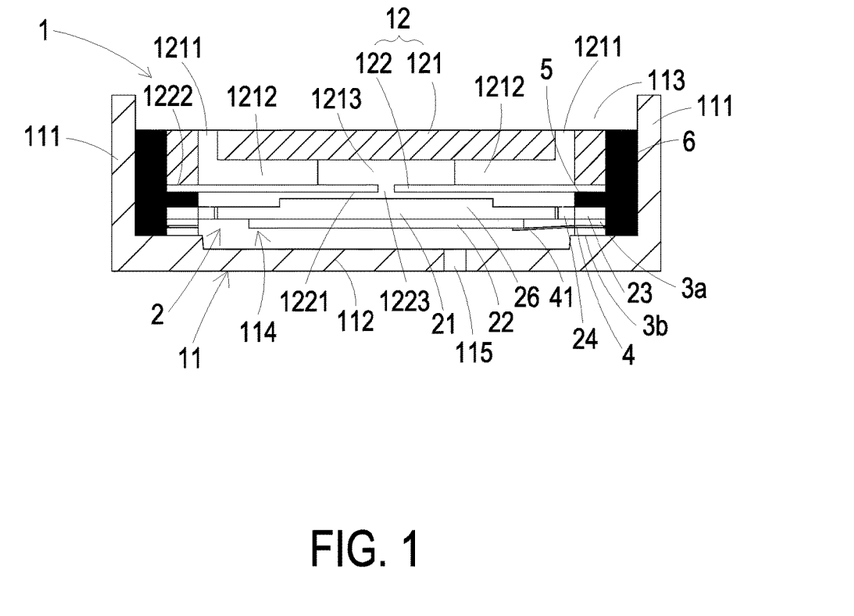
FIG. 1 is a schematic cross-sectional view illustrating a fluid control device.

FIG. 1 is a schematic cross-sectional view illustrating a fluid control device. The fluid control device comprises a housing 1, a piezoelectric actuator 2, a first insulation plate 3a, a conducting plate 4 and a second insulation plate 3b. The housing 1 comprises an outlet plate 11 and a base 12.

The outlet plate 11 comprises a sidewall 111 and a bottom plate 112. The sidewall 111 is protruded from the edges of the bottom plate 112. Moreover, an accommodation space 113 is defined by the sidewall 111 and the bottom plate 112 collaboratively. The piezoelectric actuator 2 is disposed within the accommodation space 113. A temporary storage chamber 114 is concavely formed on a surface of the bottom plate 112 for temporarily storing the fluid. At least one exit 115 penetrates through the bottom plate 112. The exit 115 is in communication with the temporary storage chamber 114.

The base 12 comprises an inlet plate 121 and a resonance plate 122. The inlet plate 121 comprises at least one inlet 1211, at least one convergence channel 1212 and a convergence chamber 1213. A first end of the at least one convergence channel 1212 is in communication with the inlet 1211. A second end of the at least one convergence channel 1212 is in communication with the convergence chamber 1213. The convergence chamber 1213 is used for temporarily storing the fluid. Moreover, the depth of the convergence chamber 1213 and the depth of the at least one convergence channel 1212 are equal. The resonance plate 122 is made of flexible material. The resonance plate 122 comprises a central aperture 1223 corresponding to the convergence chamber 1213 of the inlet plate 121. Consequently, the fluid in the convergence chamber 1213 can be transferred downwardly to the position under the resonance plate 122 through the central aperture 1223.

A process of assembling the fluid control device will be described as follows. Firstly, the outlet plate 11, the second insulation plate 3b, the conducting plate 4, the first insulation plate 3a, the piezoelectric actuator 2 and the base 12 are sequentially stacked on each other from bottom to top. Then, an adhesive 6 is coated on the region between the sidewall 111 of the outlet plate 11 and the accommodation space 113 to prevent the fluid leakage. After the above components are combined together through the adhesive 6, the fluid control device is assembled. The structure of the fluid control device is simple and slim.

The piezoelectric actuator 2 is aligned with the resonance plate 122. Moreover, the piezoelectric actuator 2 comprises a suspension plate 21, a piezoelectric element 22, an outer frame 23 and at least one bracket 24. The resonance plate 122 comprises a movable part 1221 and a fixed part 1222. The movable part 1221 is aligned with the convergence chamber 1213. The fixed part 1222 is fixed on the base 12.

Nowadays, the equipment using the fluid control device is developed toward miniaturization. Consequently, it is necessary to gradually reduce the size of the fluid control device without impairing the output capability (e.g., the output flowrate and the output pressure). However, as the size of the fluid control device is reduced, the output capability is usually impaired. For reducing the size of the fluid control device and maintaining the output capability, the structure of the fluid control device needs to be further improved.

Please refer to FIG. 1 again. As mentioned above, the outlet plate 11, the second insulation plate 3b, the conducting plate 4, the first insulation plate 3a, the piezoelectric actuator 2 and the base 12 are sequentially stacked on each other from bottom to top.

Moreover, the outer frame 23 of the piezoelectric actuator 2 is fixed on the fixed part 1222 of the resonance plate 122 through a glue body 5. That is, the distance between the suspension plate 21 and the resonance plate 122 is substantially equal to the thickness of the glue body 5. As the piezoelectric actuator 2 vibrates, the pressure of the fluid is subjected to a change. Moreover, a portion of the resonance plate 122 and the piezoelectric actuator 2 vibrate at the same frequency. That is, because of the structures of the resonance plate 122 and the base 12, the movable part 1221 facing the convergence chamber 1213 is subjected to curvy vibration. When a voltage is applied to the piezoelectric element 22, the piezoelectric element 22 is stretched or contracted. Consequently, the suspension plate 21 is subjected to the curvy vibration. While the suspension plate 21 is subjected to the curvy vibration, the movable part 1221 of the resonance plate 122 is subjected to vibration. Consequently, the fluid is fed into the at least one inlet 1211 of the base 12. After the fluid is fed into the at least one inlet 1211, the fluid is transferred to the convergence chamber 1213 through the at least one convergence channel 1212. Then, the fluid is transferred to the temporary storage chamber 114 through the central aperture 1223 of the resonance plate 122. Due to the vibration of the suspension plate 21 of the piezoelectric actuator 2 and the resonance effect of the resonance plate 122, the volume of the temporary storage chamber 114 is shrunken. Consequently, the fluid is outputted from the at least one exit 115 of the outlet plate 11. Since the movable part 1221 is vibrated with the piezoelectric actuator 2, the vibration amplitude of the fluid control device is increased. Consequently, although the size of the fluid control device is small, the output pressure and the output flowrate of the fluid control device are still large.

Generally, the piezoelectric actuator 2 is fixed on the base 12 through the glue body 5. For securely fixing the piezoelectric actuator 2 on the base 12, the glue body 5 has to be subjected to a heating and pressing process. However, after the heating and pressing process, the shapes of the suspension plate 21 and the piezoelectric element 22 are changed according to their coefficients of linear expansion (i.e., thermal deformation). Consequently, the distance between the suspension plate 21 and the resonance plate 122 is changed. As known, the distance between the suspension plate 21 and the resonance plate 122 is an important factor influencing the pressure-flowrate characteristics of the fluid control device.

As mentioned above, the pressure-flowrate characteristics of the fluid control device is changed in response to the temperature change. Therefore, there is a need of providing a fluid control device for reducing the change of the pressure-flowrate characteristics in response to the temperature change.

SUMMARY OF THE INVENTION

The present invention provides a fluid control device for reducing the change of the pressure-flowrate characteristics in response to the temperature change.

In accordance with an aspect of the present invention, a fluid control device is provided. The fluid control device includes a piezoelectric actuator, a housing and a glue body. The piezoelectric actuator includes a suspension plate, an outer frame, at least one bracket and a piezoelectric element. The outer frame is arranged around the suspension plate. The at least one bracket is connected between the suspension plate and the outer frame. The piezoelectric element attached on the suspension plate. A length of a side of the piezoelectric element is equal to or less than a length of a side of the suspension plate. The housing includes an outlet plate and a base. The outlet plate includes a sidewall and a bottom plate. The sidewall is protruded from edges of the bottom plate. An accommodation space is defined by the sidewall and the bottom plate collaboratively. The piezoelectric actuator is disposed within the accommodation space. The base includes an inlet plate and a resonance plate. The inlet plate and the resonance plate cover the accommodation space of the outlet plate to seal the piezoelectric actuator. The inlet plate includes a convergence chamber connected to outside. The resonance plate is fixed on the inlet plate. The resonance plate includes a central aperture. The central aperture is aligned with the convergence chamber. The glue body is arranged between the outer frame of the piezoelectric actuator and the resonance plate of the base. A gap is formed between the outer frame of the suspension plate and the resonance plate through the glue body. A linear expansion coefficient of the suspension plate is lower than a linear expansion coefficient of the piezoelectric element. The suspension plate has a specified hardness to maintain a curved shape after being heated. The linear expansion coefficient of the suspension plate and a linear expansion coefficient of the resonance plate are different. Consequently, an effective deformation displacement between the suspension plate and the resonance plate is obtained.

From the above descriptions, the present invention provides a fluid control device. The linear expansion coefficient of the piezoelectric element is larger than the linear expansion coefficient of the suspension plate. The area and hardness of the stainless-steel suspension plate are selected to inhibit the thermal deformation amount. Moreover, the linear expansion coefficient of the resonance plate and the linear expansion coefficient of the suspension plate are different. After the glue body between the resonance plate and the suspension plate is subjected to the heating and pressing process, the effective deformation displacement between the suspension plate and the resonance plate is achieved. Consequently, the optimized performance and flowrate can be provided. In other words, the fluid control device of the present invention is capable of reducing the change of the pressure-flowrate characteristics in response to the temperature change. The pressure-flowrate characteristics of the fluid control device can be properly maintained in a very broad temperature range. Moreover, due to the special configurations, the fluid control device of the present invention has small volume and small thickness. Consequently, the fluid control device is portable and user-friendly.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Please refer to FIGS. 1, 2A, 2B and 3. The fluid control device comprises a housing 1, a piezoelectric actuator 2, a first insulation plate 3a, a conducting plate 4 and a second insulation plate 3b. The housing 1 comprises an outlet plate 11 and a base 12. The base 12 comprises an inlet plate 121 and a resonance plate 122, but the invention is not limited thereto. The piezoelectric actuator 2 is aligned with the resonance plate 122. The outlet plate 11, the piezoelectric actuator 2, the resonance plate 122 of the base 12 and the inlet plate 121 of the base 12 are sequentially stacked on each other from bottom to top. The piezoelectric actuator 2 comprises a suspension plate 21, a piezoelectric element 22, an outer frame 23 and at least one bracket 24.

Figure 2A:
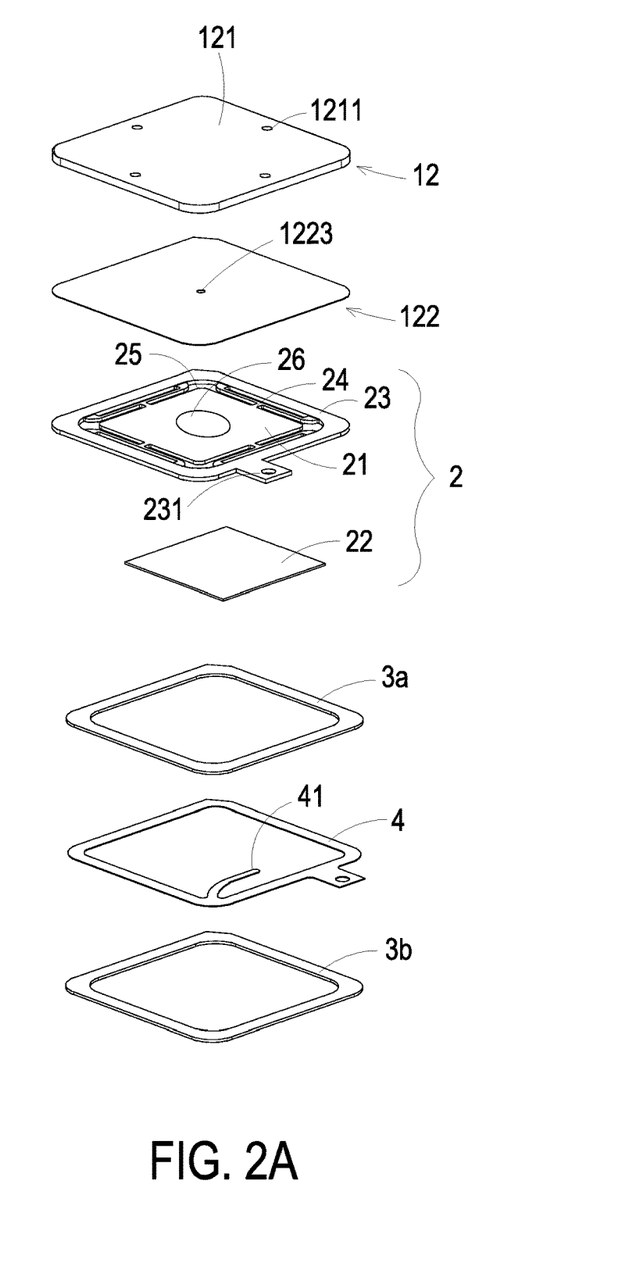
FIG. 2A is a schematic exploded view illustrating a fluid control device according to an embodiment of the present invention and taken along a front side.
Figure 2B:
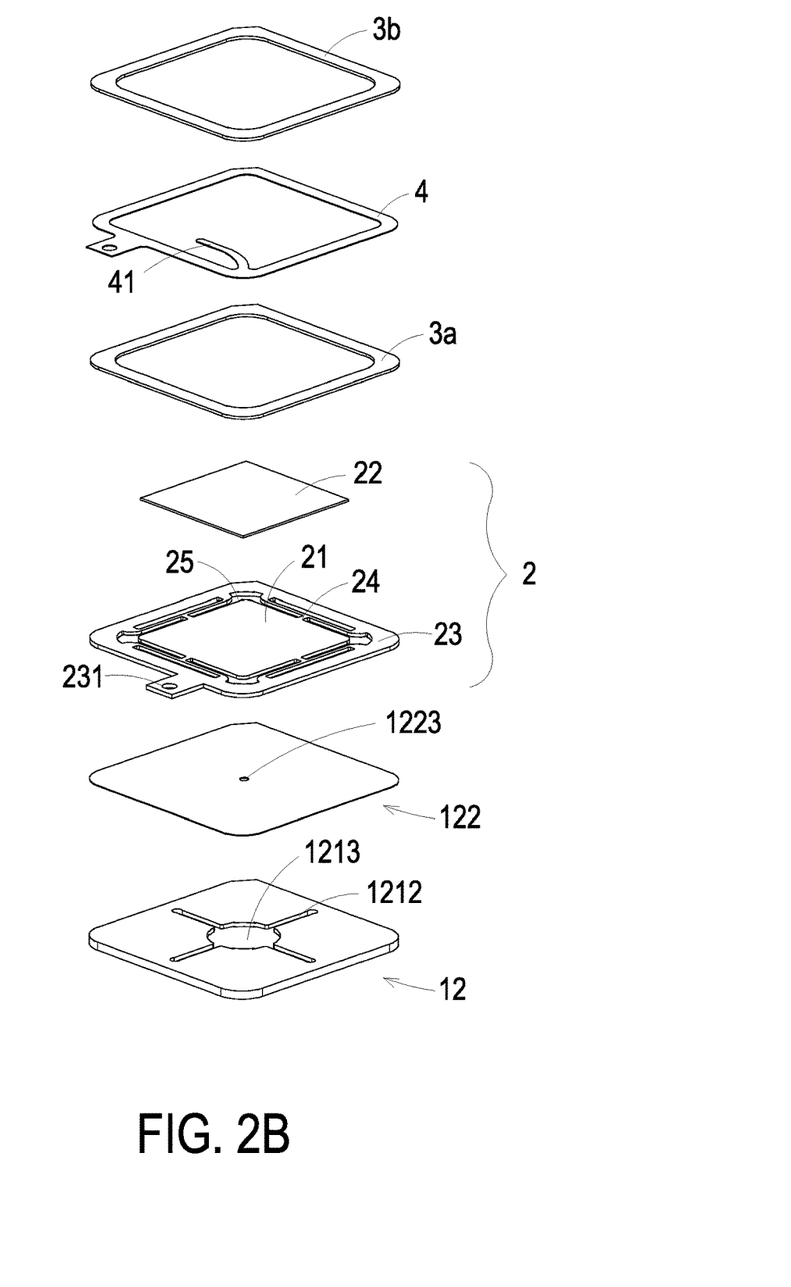
FIG. 2B is a schematic exploded view illustrating a fluid control device according to the embodiment of the present invention and taken along a rear side.

The outlet plate 11 of the housing 1 comprises a sidewall 111 and a bottom plate 112. The sidewall 111 is protruded from the edges of the bottom plate 112. Moreover, an accommodation space 113 is defined by the sidewall 111 and the bottom plate 112 collaboratively. The piezoelectric actuator 2 is disposed within the accommodation space 113. A temporary storage chamber 114 is concavely formed in a surface of the bottom plate 112 for temporarily storing the fluid. At least one exit 115 penetrates through the bottom plate 112. The exit 115 is in communication with the temporary storage chamber 114.

The base 12 comprises an inlet plate 121 and a resonance plate 122. The inlet plate 121 comprises at least one inlet 1211, at least one convergence channel 1212 and a convergence chamber 1213. In this embodiment, for example, the inlet plate 121 has four inlets 1211, but the invention is not limited thereto. These inlets 1211 penetrate through the top surface and the bottom surface of the inlet plate 121. In response to the action of the atmospheric pressure, the fluid can be introduced into the fluid control device through the at least one inlet 1211. The each one convergence channel 1212 is in communication with the one inlet 1211. The convergence chamber 1213 is located at a central convergence area of the convergence channels 1212. Moreover, the convergence chamber 1213 is in communication with the convergence channels 1212. After the fluid is introduced into the at least one convergence channel 1212 through the at least one inlet 1211, the fluid is guided to the convergence chamber 1213.

In this embodiment, the inlet 1211, the convergence channel 1212 and the convergence chamber 1213 of the inlet plate 121 are integrally formed. After the inlet plate 121 and the resonance plate 122 are combined together, the convergence chamber 1213 can temporarily store the fluid.

Preferably but not exclusively, the inlet plate 121 is made of stainless steel. Moreover, the depth of the convergence chamber 1213 and the depth of the convergence channel 1212 are equal, but the invention is not limited thereto.

The piezoelectric actuator 2 is aligned with the resonance plate 122. The piezoelectric actuator 2 comprises the suspension plate 21, the piezoelectric element 22, the outer frame 23 and the at least one bracket 24. Hereinafter, the region of the resonance plate 122 corresponding to the convergence chamber 1213 is referred as a movable part 1221 of the resonance plate 122. The region of the resonance plate 122 fixed on the base 12 is referred as a fixed part 1222. The resonance plate 122 comprises a central aperture 1223 corresponding to the convergence chamber 1213 of the inlet plate 121. Consequently, the fluid in the convergence chamber 1213 can be transferred downwardly to the position under the resonance plate 122 through the central aperture 1223. In an embodiment, the resonance plate 122 is made of flexible material, but the invention is not limited thereto. Alternatively, the resonance plate 122 is made of copper, but the invention is not limit thereto.

The piezoelectric element 22 has a square shape. The length of a side of the piezoelectric element 22 is equal to or less than the length of a side of the suspension plate 21. The piezoelectric element 22 is attached on the suspension plate 21. In an embodiment, the suspension plate 21 is a square flexible suspension plate. The outer frame 23 is arranged around the suspension plate 21. The profile of the outer frame 23 substantially matches the profile of the suspension plate 21. That is, the outer frame 23 is a square hollow frame. Moreover, four brackets 24 are connected between the suspension plate 21 and the outer frame 23 for elastically supporting the suspension plate 21. In the embodiment as shown in FIGS. 2A and 2B, the suspension plate 21, the outer frame 23 and the four brackets 24 are integrally formed and produced by using a metal plate (e.g., a stainless steel plate, but the invention is not limited thereto). That is, the piezoelectric actuator 2 of the fluid control device is a combination of the piezoelectric element 22 and the metal plate, but the invention is not limit thereto. The outer frame 23 is arranged around the suspension plate 21. Moreover, a conducting pin 231 is protruded outwardly from the outer frame 23 so as to be electrically connected with an external circuit (not shown). The four brackets 24 are connected between the suspension plate 21 and the outer frame 23 for elastically supporting the suspension plate 21. In this embodiment, a first end of the bracket 24 is connected with the corresponding lateral rim of the suspension plate 21, and a second end of the bracket 24 is connected with the corresponding inner rim of the outer frame 23. Moreover, at least one vacant space 25 is formed between the brackets 24, the suspension plate 21 and the outer frame 23 for allowing the fluid to go through. The types of the suspension plate 21 and the outer frame 23 and the type and the number of the brackets 24 may be varied according to the practical requirements. Since the brackets 24 are perpendicularly connected between the suspension plate 21 and the outer frame 23, the non-uniform deflection angle of the suspension plate 21 during operation is decreased. Consequently, the amplitude of the suspension plate 21 in the Z axis is increased, and the motion of the suspension plate 21 in the vertical direction is enhanced. That is, the operation of the suspension plate 21 becomes more stable and uniform. Under this circumstance, the stability and performance of the piezoelectric actuator 2 are enhanced.

In this embodiment, the suspension plate 21 is a square suspension plate with a stepped structure. That is, a bulge 26 is formed on a surface of the suspension plate 21. For example, the bulge 26 is a circular protrusion structure, but the invention is not limit thereto.

The conducting plate 4 is clamped between the first insulation plate 3a and the second insulation plate 3b along the vertical direction. The first insulation plate 3a and the second insulation plate 3b are made of an insulating material (e.g. a plastic material, but the invention is not limited thereto) for providing insulating efficacy. The conducting plate 4 is made of an electrically conductive material (e.g. a metallic material, but the invention is not limited thereto) for providing electrically conducting efficacy. Moreover, the conducting plate 4 has a conducting pin 41 so as to be electrically connected with an external circuit (not shown).

A process of assembling the fluid control device will be described as follows. Firstly, the outlet plate 11, the second insulation plate 3b, the conducting plate 4, the first insulation plate 3a, the piezoelectric actuator 2 and the base 12 are sequentially stacked on each other from bottom to top. Then, the combination of the above components is accommodated within the accommodation space 113. Then, an adhesive 6 is coated on the region between the sidewall 111 of the outlet plate 11 and the accommodation space 113 to prevent the fluid leakage. After the above components are combined together through the adhesive 6, the fluid control device is assembled. The structure of the fluid control device is small and slim.

When a voltage is applied to the piezoelectric element 22, the piezoelectric element 22 is stretched or contracted. Consequently, the suspension plate 21 is subjected to the curvy vibration. While the suspension plate 21 is subjected to the curvy vibration, the movable part 1221 of the resonance plate 122 is subjected to vibration. Consequently, the fluid is fed into the at least one inlet 1211 of the base 12. After the fluid is fed into the at least one inlet 1211, the fluid is transferred to the convergence chamber 1213 through the at least one convergence channel 1212. Then, the fluid is transferred to the temporary storage chamber 114 through the central aperture 1223 of the resonance plate 122. Due to the vibration of the suspension plate 21 of the piezoelectric actuator 2 and the resonance effect of the resonance plate 122, the volume of the temporary storage chamber 114 is shrunken. Consequently, the fluid is outputted from the at least one exit 115 of the outlet plate 11. In such way, the fluid can be transferred through the fluid control device.

Figure 3:
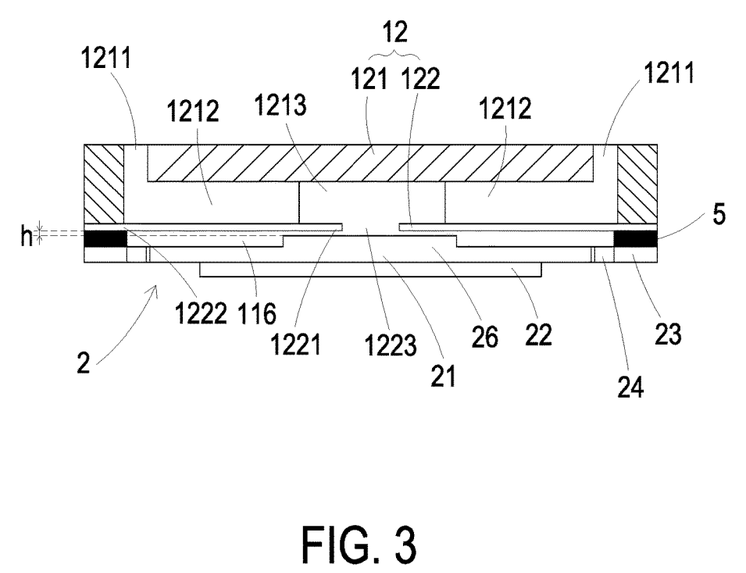
FIG. 3 is a schematic cross-sectional view illustrating the relationship between a piezoelectric actuator and a base of the fluid control device according to the embodiment of the present invention.

Please refer to FIGS. 1 and 3. Moreover, there is a gap h between the resonance plate 122 and the outer frame 23 of the piezoelectric actuator 2. In this embodiment, a glue body 5 (e.g. a conductive adhesive, but the invention is not limited thereto) is inserted into the gap h. Consequently, the depth of the gap h between the resonance plate 122 and the suspension plate 21 can be maintained to guide the gas to flow more quickly. Moreover, due to the depth of the gap h, a compressible chamber 116 is defined between the resonance plate 122 and the piezoelectric actuator 2. After the fluid is guided to the compressible chamber 116 through the central aperture 1223 of the resonance plate 122, the fluid can flow more quickly. Moreover, due to the proper distance between the resonance plate 122 and the suspension plate 21, the contact interference is reduced and the generated noise is largely reduced.

For securely fixing the piezoelectric actuator 2 on the base 12, the glue body 5 has to be subjected to a heating and pressing process. However, during the heating and pressing process, the shapes of the suspension plate 21 and the piezoelectric element 22 are changed according to their coefficients of linear expansion (i.e., thermal deformation). Consequently, the distance between the suspension plate 21 and the resonance plate 122 is changed. As known, the distance between the suspension plate 21 and the resonance plate 122 is an important factor influencing the pressure-flowrate characteristics of the fluid control device.

It is important to increase the output pressure and the output flowrate of the fluid control device. That is, the gap h has to be precisely controlled. As mentioned above, the gap h is determined according to the glue body 5. For achieving the adhering efficacy, it is necessary to heat and press the glue body 5. However, the piezoelectric actuator 2 is subjected to thermal deformation because the piezoelectric actuator 2 is made of a metallic material. For maintaining the sufficient gap h, the thermal deformation of the piezoelectric actuator 2 is limited according to a special design. Since the thermal deformation of the piezoelectric actuator 2 is effectively controlled, the effective deformation displacement δ between the suspension plate 21 and the resonance plate 122 is achieved. Under this circumstance, the optimized performance and flowrate can be achieved.

Figure 4:
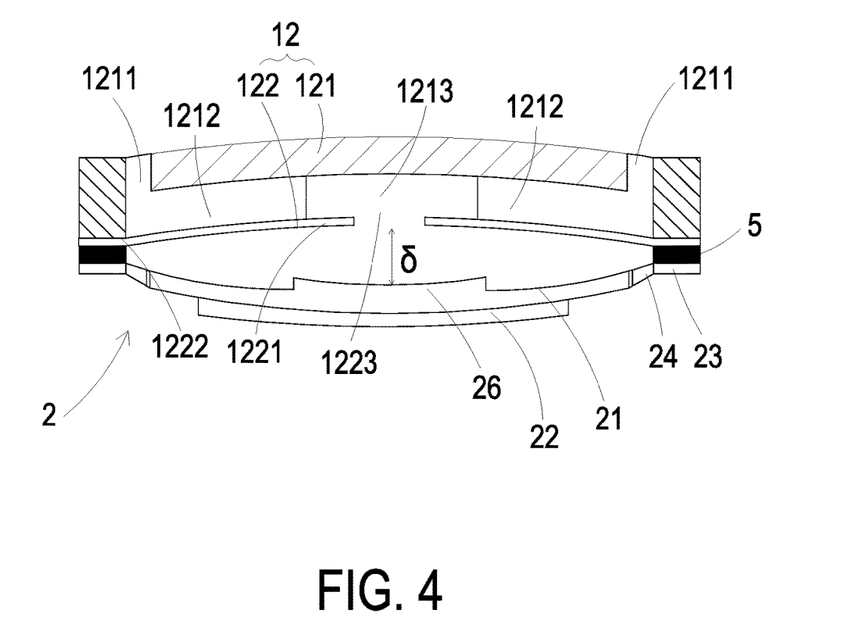
FIG. 4 is a schematic cross-sectional view illustrating the relationship between the piezoelectric actuator and the base of the fluid control device after a heating and pressing process of the glue body is completed.

The combination of the suspension plate 21 and the piezoelectric element 22 may be considered as a bimetallic strip. In some experiments, the thermal deformation amount of the piezoelectric element 22 is fixed, but the material of the suspension plate 21 is adjusted. In accordance with the present invention, the linear expansion coefficient of the piezoelectric element 22 is larger than the linear expansion coefficient of the suspension plate 21. After the heating and pressing process is performed to fix the piezoelectric actuator 2 on the base 12 through the glue body 5, the temperature is reduced to the room temperature. Since the linear expansion coefficient of the piezoelectric element 22 and the linear expansion coefficient of the suspension plate 21 are different, the suspension plate 21 is bent toward the piezoelectric element 22. As shown in FIG. 4, the combination of the suspension plate 21 and the piezoelectric element 22 is bent downwardly. Moreover, since the linear expansion coefficient of the resonance plate 122 and the linear expansion coefficient of the suspension plate 21 are different, the resonance plate 122 is bent away from the suspension plate 21, (that is, bent upwardly as shown in FIG. 4). Consequently, the effective deformation displacement δ between the suspension plate 21 and the resonance plate 122 is achieved. Under this circumstance, the optimized performance and flowrate can be achieved. In other words, the fluid control device of the present invention is capable of reducing the change of the pressure-flowrate characteristics in response to the temperature change. The pressure-flowrate characteristics of the fluid control device can be properly maintained in a very broad temperature range.

In an embodiment, the suspension plate 21 is made of stainless steel. The area and hardness of the stainless-steel suspension plate 21 are selected to inhibit the thermal deformation amount. Since the effective deformation displacement δ between the suspension plate 21 and the resonance plate 122 is controlled, the optimized performance and flowrate can be provided.

The results of the experiments are listed in the following table.

TABLE

| | | |
|---|---|---|
| Length of the square suspension plate | 4~10 mm | |
| Material hardness of suspension plate | Stainless steel (Hardness H) | Stainless steel (Hardness H/2) |
| Driving frequency of piezoelectric element | 27 kHz~29.5 kHz | |
| Output pressure (mmHg) | 300~400 mmHg | 300~400 mmHg |
| Output flowrate (ml/min) | 50~100 ml/min | 90~160 ml/min |

In the experiments, the suspension plate 21 has a square shape. The length of the suspension plate 21 is in the range between 4 mm and 10 mm. The suspension plate 21 is made of stainless steel. The hardness H denotes that the Vickers hardness number is in the range between 370HV and 410HV. The hardness H/2 denotes that the Vickers hardness number is in the range between 310HV and 350HV. Since the hardness of the stainless-steel suspension plate 21 is different, the deformation amount is different after the process of heating the glue body 5 is completed. For example, if the suspension plate 21 is made of stainless steel and has the hardness H, the deformation displacement δ between the suspension plate 21 and the resonance plate 122 is maintained in the range between 15 μm and 17 μm after the process of heating the glue body 5 is completed. If the suspension plate 21 is made of stainless steel and has the hardness H/2, the deformation displacement δ between the suspension plate 21 and the resonance plate 122 is maintained in the range between 20 μm and 25 μm after the process of heating the glue body 5 is completed. In other words, the deformation displacement δ corresponding to the suspension plate 21 with the hardness H/2 is increased by 3 μm~10 μm when compared with the deformation displacement δ corresponding to the suspension plate 21 with the hardness H. When the piezoelectric element 22 is operated at the driving frequency of 27 kHz to 29.5 kHz, the suspension plate 21 is subjected to vibration deformation. In case that the suspension plate 21 is made of stainless steel and has the hardness H, the fluid control device provides an output pressure of 300 mmHg to 400 mmHg and a flowrate of 50 ml/min to 100 ml/min. In case that the suspension plate 21 is made of stainless steel and has the hardness H/2, the fluid control device provides an output pressure of 300 mmHg to 400 mmHg and a flowrate of 90 ml/min to 160 ml/min. It is found that the output pressure is similar. However, the flowrate is distinguished. Since the flowrate corresponding to the suspension plate 21 with the hardness H/2 is larger, the gap between the suspension plate 21 and the resonance plate 122 of the fluid control device is the most effective deformation displacement 6.

From the above descriptions, the present invention provides a fluid control device. The linear expansion coefficient of the piezoelectric element is larger than the linear expansion coefficient of the suspension plate. The area and hardness of the stainless-steel suspension plate are selected to inhibit the thermal deformation amount. Moreover, the linear expansion coefficient of the resonance plate and the linear expansion coefficient of the suspension plate are different. After the glue body between the resonance plate and the suspension plate is subjected to the heating and pressing process, the effective deformation displacement between the suspension plate and the resonance plate is achieved. Consequently, the optimized performance and flowrate can be provided. In other words, the fluid control device of the present invention is capable of reducing the change of the pressure-flowrate characteristics in response to the temperature change. The pressure-flowrate characteristics of the fluid control device can be properly maintained in a very broad temperature range. Moreover, due to the special configurations, the fluid control device of the present invention has small volume and small thickness. Consequently, the fluid control device is portable and user-friendly. In other words, the fluid control device of the present invention has industrial values.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fluid control device, comprising:
   a piezoelectric actuator comprising a suspension plate, an outer frame, at least one bracket and a piezoelectric element, wherein the outer frame is arranged around the suspension plate, the at least one bracket is connected between the suspension plate and the outer frame, the piezoelectric element is attached on the suspension plate, and a length of a side of the piezoelectric element is equal to or less than a length of a side of the suspension plate;
   a housing comprising an outlet plate and a base, wherein the outlet plate comprises a sidewall and a bottom plate, the sidewall is protruded from edges of the bottom plate, an accommodation space is defined by the sidewall and the bottom plate collaboratively, and the piezoelectric actuator is disposed within the accommodation space, wherein the base comprises an inlet plate and a resonance plate, the base covers the accommodation space of the outlet plate to seal the piezoelectric actuator, the inlet plate comprises a convergence chamber connected to outside, the resonance plate is fixed on the inlet plate, the resonance plate comprises a central aperture, and the central aperture is aligned with the convergence chamber; and
   a glue body arranged between the outer frame of the piezoelectric actuator and the resonance plate of the base to maintain a gap formed between the piezoelectric actuator and the resonance plate of the base,
   wherein a linear expansion coefficient of the suspension plate is lower than a linear expansion coefficient of the piezoelectric element, and the suspension plate has a specified hardness to maintain a curved shape after being heated, and the linear expansion coefficient of the suspension plate is different from a linear expansion coefficient of the resonance plate, so that an effective deformation displacement between the suspension plate and the resonance plate is obtained.

2. The fluid control device according to claim 1, wherein the suspension plate is made of stainless steel, and the hardness of the suspension plate is in a range between 310HV and 350HV.

3. The fluid control device according to claim 2, wherein the effective deformation displacement between the suspension plate and the resonance plate is in a range between 20 μm and 25 μm after the suspension plate is subjected to a thermal deformation, and the fluid control device provides an output pressure of 300 mmHg to 400 mmHg and a flowrate of 90 ml/min to 160 ml/min.

4. The fluid control device according to claim 1, wherein the suspension plate is made of stainless steel, and the hardness of the suspension plate is in a range between 370HV and 410HV.

5. The fluid control device according to claim 4, wherein the effective deformation displacement between the suspension plate and the resonance plate is in a range between 15 μm and 17 μm after the suspension plate is subjected to a thermal deformation, and the fluid control device provides an output pressure of 300 mmHg to 400 mmHg and a flowrate of 50 ml/min to 100 ml/min.

6. The fluid control device according to claim 1, wherein the suspension plate has a square shape.

7. The fluid control device according to claim 6, wherein the length of the side of the suspension plate is in a range between 4 mm and 10 mm.

8. The fluid control device according to claim 1, wherein a driving frequency of the piezoelectric element is in a range between 27 kHz and 29.5 kHz.

9. The fluid control device according to claim 1, wherein after a heating and pressing process is performed to fix the piezoelectric actuator on the base through the glue body, the suspension plate is bent toward the piezoelectric element in the room temperature due to the different linear expansion coefficient of the piezoelectric element and the suspension plate.

10. The fluid control device according to claim 9, wherein after a heating and pressing process is performed to fix the piezoelectric actuator on the base through the glue body, the resonance plate is bent away from the suspension plate in a room temperature due to the different linear expansion coefficient of the suspension plate and the resonance plate.

11. The fluid control device according to claim 1, wherein the glue body is a conductive adhesive.

12. The fluid control device according to claim 1, wherein the inlet plate comprises at least one inlet, at least one convergence channel and the convergence chamber, wherein the at least one inlet penetrates through a top surface and a bottom surface of the inlet plate, each of the convergence channel is in communication with the at least one inlet, the convergence chamber is located at a central convergence area of the convergence channels, and the convergence chamber is in communication with the at least one convergence channel, wherein after a fluid is introduced into the at least one convergence channel through the at least one inlet, the fluid is guided to the convergence chamber.

13. The fluid control device according to claim 1, wherein a bulge is formed on a surface of the suspension plate, and the bulge is aligned with the central aperture of the resonance plate.

14. The fluid control device according to claim 1, wherein the resonance plate comprises a movable part and a fixed part, wherein the movable part is aligned with the convergence chamber, and the fixed part is fixed on the base.

15. The fluid control device according to claim 1, further comprising a first insulation plate, a second insulation plate and a conducting plate, wherein the outlet plate, the second insulation plate, the conducting plate, the first insulation plate, the piezoelectric actuator and the base are sequentially stacked on each other from bottom to top, and accommodated within the accommodation space.

* * * * *